United States Patent
Drooghaag et al.

(10) Patent No.: US 9,124,683 B2
(45) Date of Patent: Sep. 1, 2015

(54) DIAGNOSTIC ENGINE

(75) Inventors: Benoît Drooghaag, Ophain-Bois-Seigneur-Isaac (BE); Issam Wahibi, Schaerbeeck (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/344,238

(22) PCT Filed: Aug. 27, 2012

(86) PCT No.: PCT/EP2012/066609
§ 371 (c)(1),
(2), (4) Date: Mar. 11, 2014

(87) PCT Pub. No.: WO2013/045185
PCT Pub. Date: Apr. 4, 2013

(65) Prior Publication Data
US 2014/0270094 A1     Sep. 18, 2014

(30) Foreign Application Priority Data

Sep. 30, 2011  (EP) .................................... 11306261

(51) Int. Cl.
H04M 1/24     (2006.01)
H04M 3/08     (2006.01)
(Continued)

(52) U.S. Cl.
CPC .............. H04M 3/2209 (2013.01); H04M 3/08 (2013.01); H04M 3/2254 (2013.01); H04M 3/306 (2013.01); H04M 11/062 (2013.01)

(58) Field of Classification Search
CPC ..... H04M 1/24; H04M 3/306; H04M 3/2227; H04M 3/22
USPC ........... 379/1.01, 1.03, 1.04, 22.03, 24, 27.08
See application file for complete search history.

(56) References Cited

U.S. PATENT DOCUMENTS

2009/0282292 A1* 11/2009 Squire ............................. 714/39
2010/0296633 A1* 11/2010 Lindqvist et al. .......... 379/27.01
(Continued)

FOREIGN PATENT DOCUMENTS

CN         101163054A A     4/2008
WO      WO-2008/048156 A1    4/2008
WO      WO-2011/088896 A1    7/2011

OTHER PUBLICATIONS

G. It: "Proposal to Introduce Metallic Line Testing (MELT) Into G. LT", 08CC021, ITU-T Drafts, Study Period 2005-2008, International Telecommunication Union, Geneva, CH, vol. Study Group 15, 4/15, Sep. 5, 2008, pp. 1-6.

(Continued)

*Primary Examiner* — Quoc D Tran
(74) *Attorney, Agent, or Firm* — Harness, Dickey & Pierce, P.L.C.

(57) ABSTRACT

A diagnostic engine for remotely analyzing a fault of a telecommunication line includes a first measurement module adapted to be coupled to a termination of the line and adapted to measure first line characteristics according to a Metallic Line Testing measurement technique; a fault detection module to detect, based upon the first line characteristics, a fault on the line and to trigger thereupon a determining module; and a showtime module to be coupled to the termination to determine whether the line is in showtime mode and to inform thereupon the determining module accordingly. The determining module is adapted to trigger, in the event when the line being in showtime mode, activation of a second measurement module. The second measurement module is adapted to be coupled to the termination and to measure second line characteristics according to a Dual Ended Line Testing measurement technique. A combining module is coupled to the first and the second measurement module and adapted to combine the measured first and second line characteristics of the line and to analyze therewith further features of the fault.

9 Claims, 2 Drawing Sheets

Figure 1:
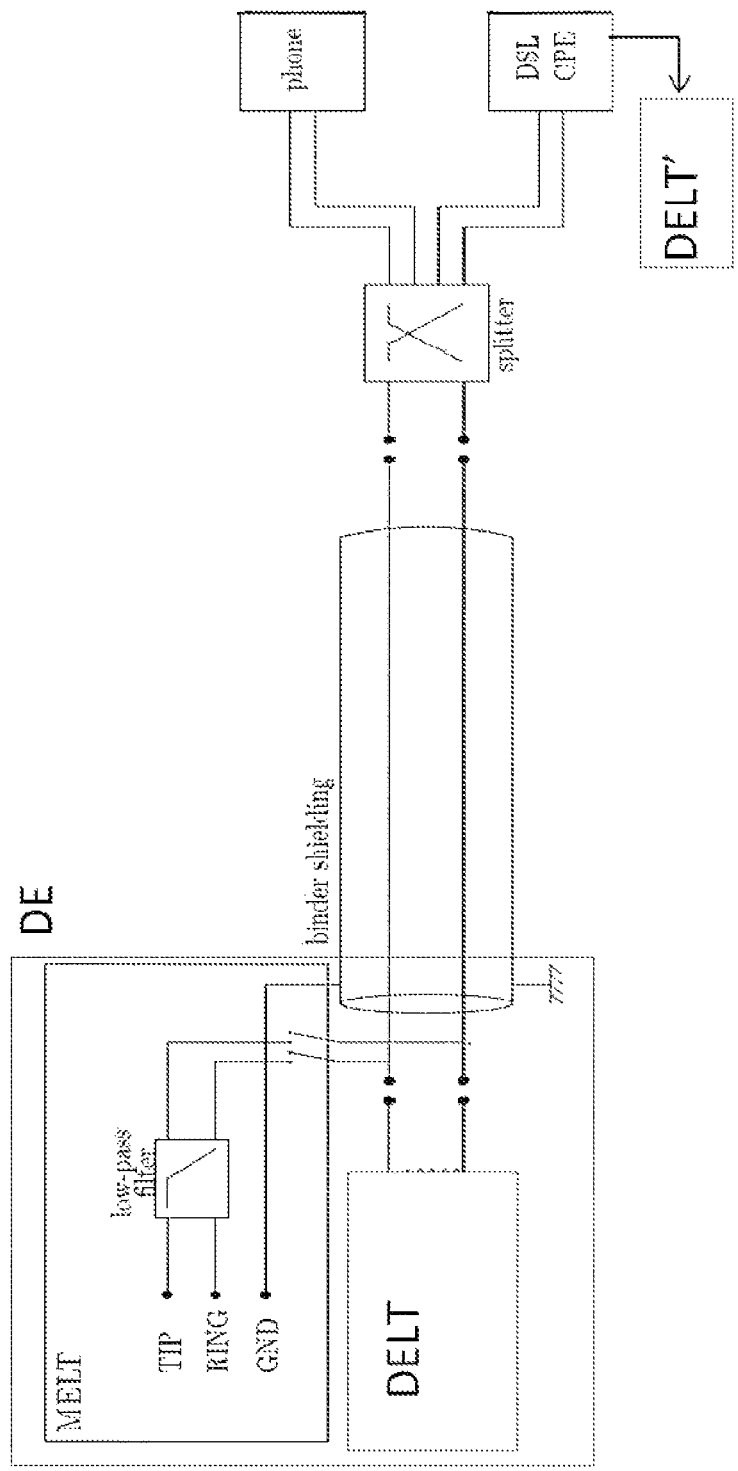

(51) Int. Cl.
*H04M 3/22* (2006.01)
*H04M 3/30* (2006.01)
*H04M 11/06* (2006.01)

(56) References Cited

U.S. PATENT DOCUMENTS

| | | |
|---|---|---|
| 2010/0296663 A1 | 11/2010 | Tkachov et al. |
| 2011/0025343 A1 | 2/2011 | Noessing et al. |
| 2012/0140901 A1* | 6/2012 | Tennyson et al. .......... 379/27.01 |
| 2013/0223599 A1* | 8/2013 | Drooghaag et al. ....... 379/27.01 |

OTHER PUBLICATIONS

Cheng Qiang, Ministry of Information Industry of China, "G. GEN, G. SELT, G. HS Proposal to Improve Test Performance of G. SELT", GB-037, ITU-T Drafts, Study Period 2005-2008, International telecommunication Union, Geneva, CH, vol. Study Group 15, 4/15, Jun. 15, 2006, pp. 1-4.

International Search Report PCT/ISA/210 for International Application No. PCT/EP2012/066609 Dated on Aug. 8, 2012.

* cited by examiner

DIAGNOSTIC ENGINE

This application is a national phase under 35 U.S.C. §371 of PCT International Application No. PCT/EP2012/066609 which has an International filing date of Aug. 27, 2012, which claims priority to European patent application number EPSN 113062616 filed Sep. 30, 2011; the entire contents of each of which are hereby incorporated by reference.

The present invention relates to a diagnostic engine for remotely analyzing a fault of a telecommunication line and a method for remotely analyzing a fault of such line.

Access network operators have a challenge of responding to growing needs of customers to benefit from new high data-rate multimedia services over access networks such as Digital subscriber Lines DSL access networks. With the expansion of the DSL deployment, the pre-qualification and maintenance of the DSL network is essential.

Metallic Line Testing MELT, being derived from Narrow Band Line Testing NBLT, and Dual Ended Line Testing DELT are two loop test and qualification technologies.

According to the MELT approach the electrical parameters in the telephonic-frequencies band are measured according to a low-frequencies line model whereas the frequency band of DELT is broader. The tools which realize the MELT are incorporated in a modem at one termination of the communication line, either at a remote unit or either at a central office. The MELT measurements techniques are performed when the DSL line is in showtime but also when the DSL line is not in showtime.

It has to be explained that when a DSL modem powers up it goes through a sync procedure, called hereafter the synchronization mode. This actual sync process varies from modem to modem but generally involves the following steps:
1. The DSL transceiver performs a self-test; and
2. The DSL transceiver checks the connection between the DSL transceiver and the computer; and
3. The DSL transceiver then attempts to synchronize with the DSLAM. Data can only come into the computer when the DSLAM and the modem are synchronized. The synchronization process is relatively quick (in the range of a few tens of seconds) but is very complex, involving extensive tests that allow both sides of the connection to optimize the performance according to the characteristics of the line in use. External or stand-alone modem units have an indicator labeled "CD", "DSL", or "LINK", which can be used to tell if the modem is synchronized. During synchronization the light flashes; when synchronized, the light stays lit, usually with a green color. Modern DSL gateways have more functionality and usually go through an initialization procedure very similar to a PC boot up. The system image is loaded from the flash memory; the system boots synchronizes the DSL connection and establishes the IP connection between the local network and the service provider, using protocols such as DHCP or PPPoE.

Furthermore, the expression Showtime mode is used in the DSL terminology to describe the mode where the user and the network can begin communications over the access network. This means that the known procedures that are utilized to enable rate adaptation; and adjustment of bandwidth and the data rate that can be supported on a particular copper loop to attain a certain bit error rate based on a Service Level Agreement SLA; or to achieve longer loop lengths or reach, are completed i.e. the initial rate adaptive operation and power adjustments are performed and communication between the network and a user can begin.

The common understanding is to consider these two above explained different phases i.e. Synchronization mode and Showtime mode. The synchronization mode is the synchronization phase during which above mentioned channel specific parameters are measured and Showtime mode refers to the period when the line is indeed in service, seen from the end user.

The Dual Ended Line Testing DELT is based on the exploitation of DSL physical layer parameters. DELT testing identifies issues on the higher line frequencies and enables the detection of problems such as bad contacts, interference, unbalanced loops, etc. The measurements for DELT are carried out by the modems at both loop ends and are done only when the DSL service is active i.e. the DSL line is in showtime mode. Dual-ended-line-test DELT measurement technique diagnoses problems by using the operational parameters of the line and quantifies directly their impact on the DSL service. Since, the DELT measurements are performed by the xDSL modems themselves when the line is in showtime mode i.e. in service or just before the line enters in service mode i.e. during the synchronization mode phase, DELT requires the connection of modems to the line as well as the presence of DSL service. When the line is broken, or when no Customer Premise Equipment CPE is present, measurements of line characteristics are unavailable. A dual ended line testing module can also be comprised in a diagnostic engine i.e. a test arrangement for collecting dual ended line testing measurements. As described above the measurements for DELT are executed by a telecommunication access node such as a Digital subscriber Line Access Multiplexer DSLAM and the customer premises equipments CPE's itself. The measurements are e.g. stored in the Management Information Base of the Access Node.

A known diagnostic engine for remotely determining global line characteristics of a telecommunication line can be a complete module application which comprises a MELT measurement module and a DELT measurement module. Such diagnostic engine is able to start measurements of MELT, start measurements of DELT, to diagnose, to detect faults and to stabilize and improve the performance in DSL lines.

Since the MELT technique and DELT technique have their own advantages and inconveniences, DELT can be activated complementary as a reactive process to the MELT in order to overcome the MELT limitations.

All kinds of faults can occur on a telecommunication line such as e.g. short-circuits, water ingress, degraded contact, . . . . Although that with the MELT technique faults such as "short" or "open circuits" can be detected, MELT has accuracy-limited capabilities for locating such faults. This means that only based upon MELT techniques, the localization of the fault is hard to determine. So, MELT can detect a fault but cannot localize the fault or at least cannot localize the fault with enough accuracy. As such, MELT has a limited diagnosis capability. Merely based upon MELT measurements techniques, the quantification of the service impact cannot be determined and the impact on wide band services is hard to predict. On the other hand with DELT measurements techniques the impact of the faults can be quantified with a high accuracy by starting in-depth line diagnosis including in-service and over-the-time diagnosis results.

An actual problem is that currently, a manual intervention is required to trigger the in-depth line diagnosis when the customer complains at the helpdesk. Such in-depth line quality diagnosis by means of e.g. a DELT monitoring over a given time period of e.g. 6 hours requires a lot of time for executing such procedures whereby a high cost for operators is generated. The actual procedure is considered as a reactive process whereby a lot of time is spent by executing the manual procedure.

An object of the present invention is to provide a diagnostic engine for remotely analyzing a fault of a telecommunication line and a related method, such as the known types but wherein a manual triggering of the process is avoided.

According to the invention, this object is achieved due to the fact that upon detection of deviations in the results of daily line testing measurements such as MELT, the execution of a service sensitive line testing measurement DELT is automatically triggered. In this way the process becomes a proactive process.

Indeed, a diagnostic engine for remotely analyzing a fault of a telecommunication line is claimed. The diagnostic engine is coupled to a termination of the line and comprises:
- a first measurement module adapted to be coupled to the termination and adapted to measure first predetermined line characteristics according to a Metallic Line Testing measurement technique; and
- a fault detection module to detect, based upon the first predetermined line characteristics, a fault on the line and to trigger thereupon a determining module; and
- a showtime module coupled to the termination to determine whether the line is in showtime mode and to inform thereupon the determining module accordingly; and
- the determining module adapted to trigger, in the event when the line being in showtime mode, activation of a second measurement module; and
- this second measurement module is adapted to be coupled to the termination and to measure second predetermined line characteristics according to a Dual Ended Line Testing measurement techniques whereby a an in-depth line diagnosis can be performed; and
- a combining module which is adapted to be coupled to the first and to the second measurement module and adapted to combine the measured first and second predetermined line characteristics of the line and to analyze therewith further features of the fault.

The main benefit of this solution resides in the fact that instead of using separately anyone of MELT or DELT, the advantages of both MELT and DELT are exploited. This is realized by using DELT as a complementary tool of MELT and by installing an automatic collaboration between both approaches. Hereby more information about some kind of faults is obtained and the service impact of the abnormality which was detected by MELT can be quantified. A manual intervention is as such avoided. The present application designs an automatic process which triggers an execution of Dual Ended Line Testing for in-depth line diagnosis, at the moment when a fault is detected and it helps DSL operators to gain time, reduce cost and number of customer complaints at the helpdesk.

In this way, the method for remotely analyzing a fault of a telecommunication line, describes measuring first predetermined line characteristics at the termination of the line according to a Metallic Line Testing measurement technique. MELT works independently of service activation i.e. showtime mode or no showtime mode. However, MELT is not able to quantify the service impact and MELT has limited diagnosis. But, based upon the first predetermined line characteristics, a fault on the line can be detected. The occurrence of a fault can be determined by e.g. comparing over different and longer time periods the measured values. In the event when major deviations are registered, the presence of a fault can be suspected. The method comprises herefor a step of detecting, based upon the first predetermined line characteristics, a fault on the line and thereby, in the event of detecting such fault, triggering a determining module.

Furthermore, the method comprises a step of determining with a showtime module whether the line is in showtime mode or not and informing thereupon a determining module accordingly i.e. the showtime module reports towards the determining module either a "showtime mode" signal or a "no showtime mode signal". In the event when the line being in showtime mode, an automatic step of triggering is performed by the determining module in order to activate a second measurement module. Indeed, since MELT works independently of service activation i.e. the line is either completely inactive, or in the intermediate phase of synchronization mode or in showtime mode. Since DELT requires communication between modems at both ends, this aspect should be checked. In the event when the line is in showtime, the determining module executes a step of triggering an activation of a second measurement module. This second measurement module performs the steps of measuring second predetermined line characteristics according to a Dual Ended Line Testing measurement technique and thereby performing in-depth line diagnosis. Finally the combining module executes of steps of combining the measured first and second predetermined line characteristics of the line and analyzing therewith further features of the fault. As such, based upon the DELT measurements, faults such as problems like bad contact, untwisted wires, loop unbalance, abnormal crosstalk, bridge-tap are detected. DELT is automatically triggered and the DELT monitoring over time starts automatically in order to quantify service impact abnormality and to refine the fault diagnosis.

A preferred embodiment of the present basic idea is that diagnostic engine further comprises a severe module that is coupled to the fault detection module and which is adapted to determine whether the fault is a severe fault or not and to inform thereupon the determining module accordingly. The determining module is hereby further adapted to force, in the event when the line is showtime and the fault is a severe fault, a restart of the synchronization mode of the line. The determining module hereby ensures that the measurement of the second predetermined line characteristics according to said Dual Ended Line Testing measurement technique are performed at least during the phase of synchronization mode. Such a severe fault is predefined by e.g. the operator as predefined category of kind of faults among the possible MELT faults.

It has to be explained that in the in the Standards SERIES G: TRANSMISSION SYSTEMS AND MEDIA, DIGITAL SYSTEMS AND NETWORKS—Digital sections and digital line system—Access networks: Single-ended line testing for digital subscriber lines (DSL) with reference G.996.2, possible MELT faults are described. According to the operator's preferences, the operator classifies the possible kind of MELT faults into categories according to a "severe fault" or a "less severe fault". An example of a possible classification for some MELT defaults, as described by the above mentioned standard, and with values as can be predefined by an operator, can be given as follows:

A) Severe faults:
A Resistive fault with an insulation resistance< 150 kOhms
Hazardous voltage with a voltage on the wire> 50V
B) Non-Severe faults:
leakage fault with 150 kOhms< insulation resistance< 3.5 MOhms
Foreign voltage with 6V< voltage on the wire< 50V Furthermore it has to be explained that DELT monitoring has to be performed at a moment when there is at least activity on the line. This means that the line should be either in synchronization mode or in showtime mode. Most DELT measurement can be performed completely transparent for the end-user i.e. during showtime mode. However, some kind of DELT measurements such as Quiet Line Noise QLN and the channel characteristics function H log can only be performed during the synchronization mode. Monitoring the line during the synchronization mode is mandatory to guarantee valid and up-to-date values for those parameters. Moreover the parameters that can only be measured during synchronization mode are useful parameters for further diagnosis of the fault e.g. the channel characteristics, H log(f) provides valuable information about the physical condition of the copper loop and its topology. On the other hand, it has to be understood that performing these specific DELT measurements for all lines during the synchronization mode would take too much time, request too much CPU resources, generate too much traffic on the management network and generate useless service interruption on the majority of the lines for which there is no problem.

Depending on the severity of the fault which has been detected by MELT and according to the operator's predefined categories, the diagnosis engine decides to launch DELT with or without the resynchronization of the line. In the event when the line is in showtime mode and the fault is a severe fault, the line should be interrupted for e.g. 30 to 60 seconds whereupon resynchronization of the line can start up again i.e. the line is forced into the synchronization mode.

The method for remotely analyzing a fault of a telecommunication line according to the basic idea is accordingly implemented with the following further steps of determining by means of a severe module whether the fault is a severe fault and informing thereupon the determining module accordingly, with such a severe fault being a predefined category of kind of faults among the possible MELT faults; and forcing by means of the determining module, in the event when the line is in showtime mode and the fault is indeed a severe fault, a restart of a synchronization mode of the line and ensuring thereby measurement of the second predetermined line characteristics according to the Dual Ended Line Testing measurement technique at least during this synchronization mode.

A further implementation is described for the determining module which is further adapted to delay such a possible restart of the synchronization mode of the line, together with the trigger for the activation of the second measurement module, until a predefined time moment. Indeed, although the MELT fault can already be automatically categorized by the combining module as a major fault i.e. a severe fault, according the predefined operator's preferences, it is decided that the fault is not severe enough to initiate the resynchronization immediately. The automatic restart of the synchronization of the line is delayed until a predefined time moment. This time moment can for instance be predefined as a time moment during the night.

Still a further embodiment is described for the event when the line is not in showtime but the fault seems to be a severe fault. In such a situation the determining module is further adapted to wait, until a synchronization mode of the line starts but to take immediately advantage of it when it comes so far. The determining module ensures thereby measurement of the second predetermined line characteristics according to the Dual Ended Line Testing measurement technique at least during the synchronization mode.

A fourth combination of the showtime module reporting with the severe module reporting is the situation when the line is not in showtime and the fault is not a severe fault. The determining module is hereby adapted to delay, in the event when the line is not in showtime mode and the fault is not a severe fault, activation of the second measurement module until the showtime module reports that the line is in showtime mode.

A further possible implementation is that the diagnostic engine according to the present application is comprised in a telecommunication access node.

A final implementation is that the diagnostic engine is coupled to a DSL telecommunication line.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Figure 2:
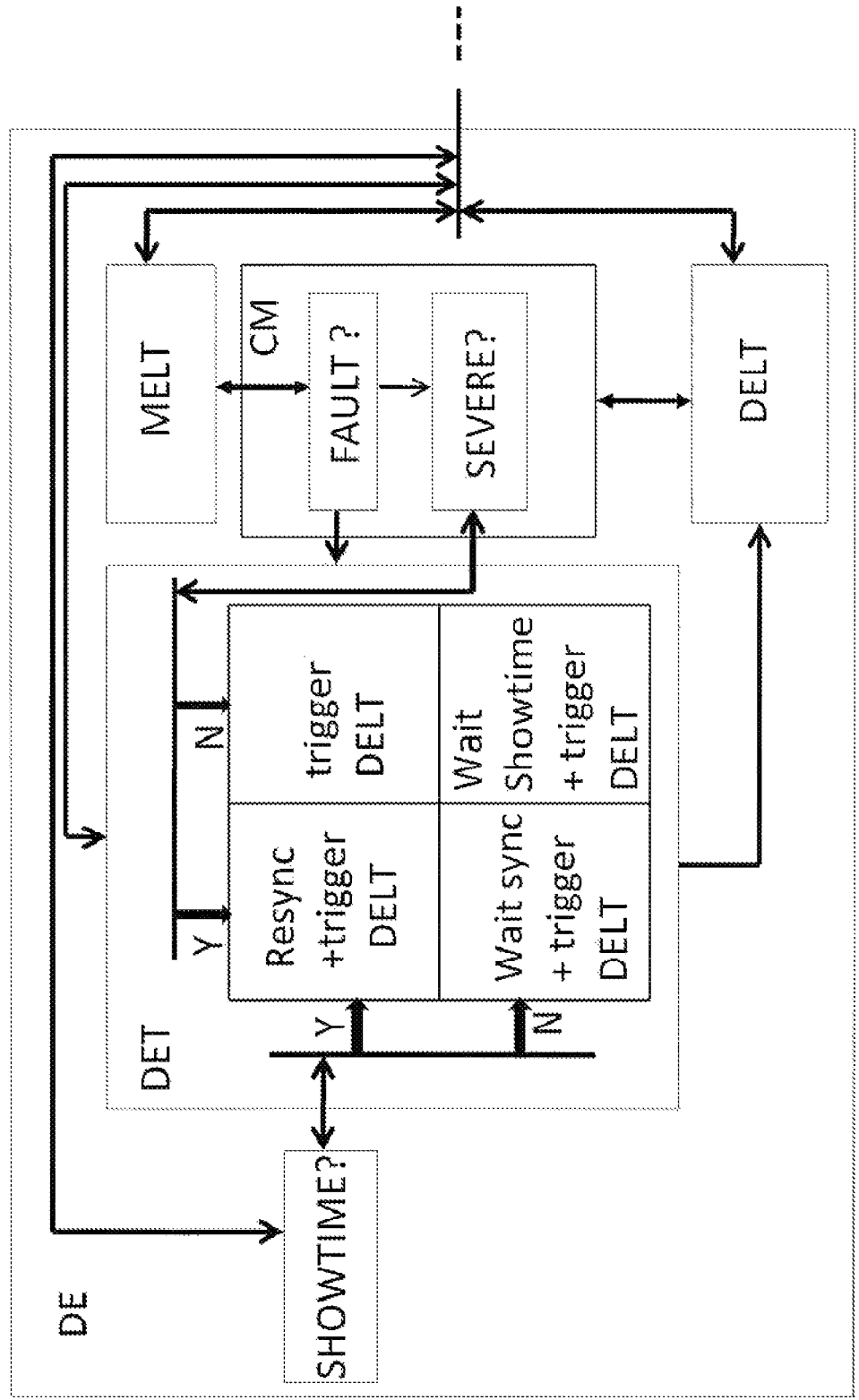

The above and other objects and features of the invention will become more apparent and the invention itself will be best understood by referring to the following description of an embodiment taken in conjunction with the accompanying drawings wherein FIG. 1 represents an access telecommunication line coupled to a diagnostic engine and FIG. 2 represents a diagnostic engine according to the present application.

The working of the device according to the present invention in accordance with its telecommunication environment that is shown in FIG. 2 will be explained by means of a functional description of the different blocks shown therein. Based on this description, the practical implementation of the blocks will be obvious to a person skilled in the art and will therefor not be described in details. In addition, the principle working of the method for remotely analyzing a fault of a telecommunication line is described in further detail.

Referring to FIG. 1, an access telecommunication line is shown. As a matter of example, the line is coupled at one termination to two end-user devices i.e. a telephone device and a DSL Customer Premises Equipment CPE. The line is coupled with the other termination to a diagnostic engine DE.

In the following paragraphs the global working of the respective measurement techniques MELT and DELT will be explained.

A telephone line realized by means of a twisted pair in a grounded binder shielding is shown as the telecommunication access line.

The Metallic Line Testing technique MELT is, as mentioned above, a one-ended line testing solution within a narrow bandwidth and is also known as Narrow Band Line Testing NBLT solution. Such a MELT module is coupled to a termination of the telecommunication line. A direct metallic connection is established between each of the two wires, TIP and RING. The binder shielding is connected to earth potential GND. As such MELT tests offer a three-wire measurement solution. AC and DC voltage/current measurements are collected. This allows an estimation of the narrow-band line model parameters i.e. the line characteristics according to MELT measurement techniques, such as the resistance, capacitance, its termination impedance and insulation resistance.

However, MELT techniques only deliver low frequencies circuit line characteristics.

In order to investigate the operational parameters of the line and to and directly quantify their impact on the DSL service, the DELT measurement technique is used. The Dual-Ended Line Test DELT measurements are performed by the xDSL modems themselves when the line is in service or just before the line enters in service, during the initialization phase i.e. the line is in showtime mode. The resulting measured line characteristics are stored in the modem equipments and can be polled by a software having access to the operator management network. As the measurements are done by the modems themselves, DELT is only available when the modems are connected to the line at both sides and when the modems have been or are in service for a while. When the line is broken, or when no Customer Premise Equipment CPE is present, those measurements get unavailable or meaningless. DELT is used to detect problems on the physical layer and quantify their impact on the service. The measurements are taken in the xDSL band (typical from 20 kHz to a few MHz depending on the xDSL technology type), which makes them very useful to quantify the impact on the problem to the xDSL service that should work within the same frequency band.

The diagnostic engine DE comprises such a first measurement module MELT and such a second measurement module DELT. As explained above, the MELT technique is not sufficient to analyze all the features of a fault. Furthermore the MELT technique can be combined with the DELT technique. However, this is a manual combination which is executed by the operator upon customer complaints.

This problem is solved with an automatic diagnostic engine according to the present application and which is shown in FIG. 2.

Referring to FIG. 2, the diagnostic engine comprises a first measurement module MELT and a second measurement module DELT. Both measurement modules are coupled to the telecommunication line as explained above. It has to be remarked that for simplicity of this FIG. 2, only one line is shown for the representation of the coupling to the twisted pair.

In addition to the MELT and DELT module, the diagnostic engine DE further comprises:
- a determining module DET; and
- a combining module CM; and
- a showtime module SHOWTIME.

The combining module comprises on its turn a fault detection module FAULT and a severe module SEVERE.

The telecommunication line is, besides being coupled to the DELT and MELT module, also coupled to the showtime module SHOWTIME and the determining module DET.

The fault module FAULT is coupled to the first measurement module MELT and also to the severe module SEVERE.

The fault module FAULT is further coupled to the determining module DET which on its turn is coupled to the showtime module SHOWTIME and to the second measurement module DELT.

The working of the diagnostic engine DE according to the present application will now be explained.

As explained above, the first measurement module MELT measures the first predetermined line characteristics according to a Metallic Line Testing measurement technique. This MELT measurement technique is similar to the MELT measurement technique as explained for FIG. 1.

The MELT measurements are saved in a memory module (not shown), analyzed and compared to previous measurement. This memory can for instance be integrated in the fault detection module. In the event of a major deviation between actual measurements and previous measurements, the fault detection module detects based upon these first predetermined line characteristics a fault and automatically generates an alarm signal i.e. the fault detection module FAULT triggers immediately the determining module DET.

Upon reception of an alarm signal, the determining module DET communicates with the showtime module SHOWTIME in order to determine the actual status of the line. The showtime module SHOWTIME determines the status of the line. According to the actual embodiment the determining module is coupled to the communication line and is enabled to determine whether the two modems at both telecommunication line ends are in communications over the access network. It has to be remarked that the determination of showtime-mode is not limited to such a direct coupling to the lines itself. Alternative embodiments such as e.g. analyzing of the received data at the network site can be used as well. The showtime module SHOWTIME informs thereupon the determining module DET accordingly. Referring to FIG. 2 "showtime mode" is shown by means of a "Y" next to the coupling between the showtime module SHOWTIME and the determining means DET; and the "no showtime mode" is shown by means of a "N" next to the coupling between the showtime module SHOWTIME and the determining means DET.

In the event when showtime-mode is confirmed for the telecommunication line to the determining module DET, different situation are still possible which will be discussed in a following paragraph, but the determining module DET triggers, the sooner or later, automatically activation of the second measurement module DELT.

In the event when showtime-mode is not confirmed for the telecommunication line an automatic trigger is not yet provided. Since showtime mode or synchronization mode is mandatory for a DELT measurement, in a situation that the line is not in showtime mode and nor in synchronization mode, the determining module DET is obliged to wait until service is activated and the line comes in synchronization mode and/or showtime-mode.

The second measurement module DELT is adapted to measure second predetermined line characteristics according to a Dual Ended Line Testing measurement technique. This DELT measurement technique is similar to the DELT measurement technique as explained for FIG. 1.

Finally, the combining module CM combines the measured first and second predetermined line characteristics of the line and analyzes therewith further features of the fault.

According to this actual described preferred embodiment and as mentioned above, according to the operator's preferences the different possible MELT faults are categorized in different predefined categories. This predefinition is, without limitation to this detailed implementation, stored in the severe module SEVERE. In the event when a fault is detected by the fault module FAULT, the fault module forwards measurement related to the detected fault towards the severe module SEVERE. The severe module SEVERE automatically compares the received measurements with the predefined limits of the different predefined categories. In this way the severe module SEVERE automatically determines whether the fault is a severe fault or not. Presume, according to the actual described embodiment two categories of MELT faults i.e. "severe fault" which is shown with a "Y" next to the arrow coming from the severe module SEVERE; and a "not severe fault" which is shown with a "N" next to the arrow coming from the severe module SEVERE.

Once a fault is detected based upon the MELT measurements, and the determining module DET is triggered thereof, it communicates with the severe module SEVERE. The severe module SEVERE determines whether the fault is a severe fault or not and informs thereupon the determining module accordingly.

The different combinations between showtime mode Y/N and sever fault Y/N and the associated decisions and action to be taken by the determining means DET are visualized in the present FIG. 2 by means of a table.

A first combination is described for the situation whereby the line is in showtime mode (SHOWTIME Y) and the fault is not a severe fault (SEVERE N). The determining module triggers the activation of the second measurement module DELT. This is shown in the table with the action "DELT".

Further referring to FIG. 2 and according to this table, in the event when the line is in showtime (SHOWTIME Y) and the fault being a severe fault (SEVERE Y), the determining module DET restarts a synchronization mode of the line. As mentioned above, in such a situation is the detected MELT fault severe enough to allow an interruption of the service which is delivered to the user i.e. showtime is interrupted. The line upon which a MELT fault is detected is again synchronized or also called "the line is forced in sync". In practice this means that the line is interrupted for 30 to 60 seconds after which synchronization mode is restarted again. In the mean time the determining means DET also triggers the second measurement module whereby it ensures that measurement of the second predetermined line characteristics according to the Dual Ended Line Testing measurement technique are performed at least during the synchronization mode of the line. This situation is shown with "Resync+DELT" i.e. actively forcing restart of a synchronization mode of the line and ensuring thereby measurement of the second predetermined line characteristics according to the Dual Ended Line Testing measurement technique at least during this synchronization mode.

A possible implementation of the execution of the "Resync+DELT" is that the determining module DET delays the restart of the synchronization mode, together with the trigger of the activation of the second measurement module DELT of the line until a predefined time moment e.g. until a time moment during the night.

Another combination of the showtime-value and severe-fault-value is the when line is not in showtime (SHOWTIME N) and the fault is a severe fault (SEVERE N). Referring to FIG. 2, the action "Wait sync+DELT" is advised. Since the fault is severe enough, advantage should be taken of the fact that once the line comes into synchronization mode, intensive measurements should be taken. The determining module DELT waits (passive) until a synchronization mode of the line starts to ensure thereby measurement of the second predetermined line characteristics according to the Dual Ended Line Testing measurement technique at least during that synchronization mode.

A last combination is described when the line not in showtime (SHOWTIME N) and the fault is not a severe fault (SEVERE N). The determining module DET delays in such a situation the activation of the second measurement module until the showtime module SHOWTIME reports that the line came into showtime mode. Indeed, the fault is not severe enough to allow collection of massive date during the previous synchronization mode and the second measurement module is only triggered and activated when showtime is indeed established.

It has to be remarked that according to the actual described embodiment, the fault detection module FAULT and the severe module SEVERE are comprised in the Combining module CM. However, the implementation of the actual basic idea is not limited to such implementations. Small modifications can be brought to the above description in order to describe an embodiment where the fault detection module is not comprises in the combining module.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A diagnostic engine for remotely analyzing a fault of a telecommunication line, said diagnostic engine being adapted to be coupled to a termination of said line and wherein said diagnostic engine comprises:
   a first measurement module adapted to be coupled to said termination and adapted to measure first line characteristics according to a Metallic Line Testing measurement technique; and
   a fault detection module to detect, based upon said first line characteristics, a fault on said line and to trigger thereupon a determining module; and
   a showtime module to be coupled to said termination to determine whether said line is in showtime mode and to inform thereupon said determining module accordingly; and
   said determining module adapted to trigger, in the event when said line being in showtime mode, activation of a second measurement module; and
   said second measurement module adapted to be coupled to said termination and to measure second line characteristics according to a Dual Ended Line Testing measurement technique;
   a combining module coupled to said first and said second measurement module and adapted to combine said measured first and second line characteristics of said line and to analyze therewith further features of said fault;
   a severe module to be coupled to said fault detection module and adapted to determine whether said fault is a severe fault and to inform thereupon said determining module accordingly; and
   said determining module being further adapted to force, in the event when said line being in showtime and said fault being a severe fault, restart of a synchronization mode of said line and to ensure thereby measurement of said second-line characteristics according to said Dual Ended Line Testing measurement technique at least during said synchronization mode, said severe fault being a predefined category of kind of faults among the possible MELT faults.

2. The diagnostic engine of claim 1, wherein said determining module being further adapted to delay, said restart of said synchronization mode of said line and said trigger of said activation of said second measurement module (DELT), until a predefined time moment.

3. The diagnostic engine of claim 1, wherein said determining module being further adapted to wait, in the event when said line not being in showtime and said fault being a severe fault, until a synchronization mode of said line starts to ensure thereby measurement of said second line characteristics according to said Dual Ended Line Testing measurement technique at least during said synchronization mode.

4. The diagnostic engine of claim 1, wherein said determining module being further adapted to delay, in the event when said line not being in showtime and said fault not being a severe fault, activation of said second measurement module until said showtime module reports that said line is in showtime mode.

5. The diagnostic engine of claim 1, wherein diagnostic engine is comprised in a telecommunication access node.

6. The diagnostic engine according to claim 1, wherein said line is a DSL telecommunication line.

7. A method for remotely analyzing a fault of a telecommunication line wherein said method comprises:
- measuring first line characteristics at a termination of said line according to a Metallic Line Testing measurement technique; and
- detecting with a fault detection module, based upon said first line characteristics, a fault on said line and thereby, in the event of detecting such fault, triggering a determining module; and
- determining with a showtime module whether said line is in showtime mode and informing thereupon a determining module accordingly; and
- triggering with said determining module, in the event when said line being in showtime mode, activation of a second measurement module; and
- with said second measurement module measuring second line characteristics according to a Dual Ended Line Testing measurement technique;
- combining with a combining module said measured first and second line characteristics of said line and analyzing therewith further features of said fault
- determining by means of a severe module whether said fault being a severe fault and informing thereupon said determining module accordingly; and
- forcing by means of said determining module, in the event when said line being in showtime mode and said fault being a severe fault, a restart of a synchronization mode of said line and ensuring thereby measurement of said second-line characteristics according to said Dual Ended Line Testing measurement technique at least during said synchronization mode, said severe fault being a predefined category of kind of faults among the possible MELT faults.

8. The method for remotely analyzing a fault of a telecommunication line according to claim 7, wherein said method further comprises a steps of waiting, in the event when said line not being in showtime and said fault being a severe fault, until said line comes into a synchronization mode and ensuring thereby measurement of said second line characteristics according to said Dual Ended Line Testing measurement technique at least during said synchronization mode.

9. The method for remotely analyzing a fault of a telecommunication line according to claim 7, wherein said method further comprises a step of waiting, in the event when said line not being in showtime and said fault not being a severe fault, until a reporting step of said showtime module that said line is in showtime mode being received.

\* \* \* \* \*